May 12, 1970     M. SCHLAUPITZ     3,511,355

DISCHARGING DEVICE FOR BOTTLE CLEANING MACHINES

Filed Aug. 14, 1967     2 Sheets-Sheet 1

INVENTOR.
MANFRED SCHLAUPITZ
BY

May 12, 1970     M. SCHLAUPITZ     3,511,355
DISCHARGING DEVICE FOR BOTTLE CLEANING MACHINES

Filed Aug. 14, 1967     2 Sheets-Sheet 2

INVENTOR.
MANFRED SCHLAUPITZ

United States Patent Office 3,511,355
Patented May 12, 1970

3,511,355
DISCHARGING DEVICE FOR BOTTLE
CLEANING MACHINES
Manfred Schlaupitz, Meisenheim (Glan), Germany, assignor to Seitz-Werke G.m.b.H., Bad Kreuznach, Germany
Filed Aug. 14, 1967, Ser. No. 660,495
Claims priority, application Germany, Aug. 22, 1966, S 105,463
Int. Cl. B65g 47/00
U.S. Cl. 198—20          5 Claims

ABSTRACT OF THE DISCLOSURE

The present invention relates to a discharging device for bottle cleaning machines with circulating bottle unloading means arranged below a bottle exit, according to which a first conveyor conveys the bottles in individual compartments to and individually releases the bottles through said exit onto said unloading means from where the bottles are deposited on a depositing plate and subsequently are transferred from said depositing plate onto a second conveyor.

---

The device according to the present invention is characterized primarily in that said unloading means includes at least two wedge-shaped follower means offset with regard to each other and each provided with a first substantially horizontal surface and with a second surface forming an angle thereto, said first and second surfaces in effective position of said follower means forming a top and front surface respectively, and endless means for circulating said follower means along an endless path.

The present invention relates to a discharging device for bottle cleaning machines, especially with continually moved bottle baskets and a horizontal discharging plate located below the bottle exit, the bottles being moved over said discharging plate to conveying means for removing the bottles.

Cleaning machines of the above mentioned type in which the bottles inserted into adjacent compartments of the bottle baskets are by means of endless transporting chains conveyed to the various treatment stations and subsequently are moved to the bottle exit, are equipped with discharging devices of various designs. In principle, these devices are mostly based on the same fundamental idea, namely by means of a downward movement to discharge the bottles from the exit opening always located above the discharging plate to the bottle plate and subsequently by means of a further horizontal movement to convey the bottles to a conveying means. Heretofore known devices of the type involved bring about these movements by a special member or device each. Thus, the downward movement of the bottles is effected, for instance, by means of a horizontal bar extending below the bottle exit and connected to endless chains and guided around a sliding path. By means of an additional slide movable in horizontal direction, the bottles are subsequently conveyed from the depositing or discharging plate to the conveyor. Other discharging devices for overcoming the difference in height between the bottle exit and the depositing plate employ a rail or the like which is movable upwardly and downwardly by means of oscillating levers. However, also in this instance the slide remains indispensable for the transfer of the bottles from the depositing plate to the conveyor means.

A further heretofore known device is based on the finding that the discharge of bottles in connection with cleaning machines can be considerably simplified with only one movable discharging member which lowers the bottles freed from their compartments onto the depositing plate while simultaneously moving the bottles onto the transporting means. This device employs as discharging member rotatable cam discs which have a segment for receiving and lowering the bottles onto the depositing plate and have a further segment for moving the bottles over onto the transporting means. However, it has been found that the cam discs are suitable for such cleaning machines only in which the difference in height between the bottle exit and the depositing plate is rather low. It is for this reason that in practice machines with the heretofore known rotating discharging device are employed only for the cleaning of bottles up to a medium size. Beyond this size, these machines are limited only to processing one bottle size. A possible changeover to another bottle size will in each instance require additional cam discs in conformity with the respective bottles to be cleaned which discs can be exchanged and installed only after a rather difficult and time consuming assembly and disassembly of the device. All these drawbacks make the heretofore known devices unsuitable for use as bottle cleaning machines which will be able to handle all marketable bottle sizes without previous disassembly and re-assembly of the respective device.

It is, therefore, an object of the present invention to provide a discharging device for bottle cleaning machines with a bottle outlet, which will overcome the above mentioned drawbacks.

It is another object of this invention to provide a bottle discharging device for use in connection with bottle cleaning machines, which will be provided with discharging means for lowering and transporting the bottles to conveying means which can be used for any bottle size without previous changes, disassembly or assembly work.

These and other objects and advantages of the invention will appear more clearly from the following specification in connection with the accompanying drawings, in which.

The device according to the present invention is characterized primarily in that each discharging member comprises at least two wedge-shaped followers which are composed of individual members and which are movable relative to each other. These followers are offset with regard to each other and are connected to an endless supporting member circulating around oppositely located reversing means. Each of said followers has one follower surface which is perpendicular to the depositing plate and another follower surface which is horizontal thereto.

According to a preferred embodiment of the present invention, the said supporting means comprise a plurality of horizontal bars which are combined to a plurality of groups and respectively receive an individual member of the wedge-shaped follower. The said horizontal bars are connected to endless chains or cables which pass around oppositely located shafts within the range of the bottle exit and of the depositing plate.

The invention furthermore provided that the supporting means is covered by a plate which is provided with cutouts for the passage of the follower means and which has guiding strips or rails located laterally of the said cutouts.

Figure 1:
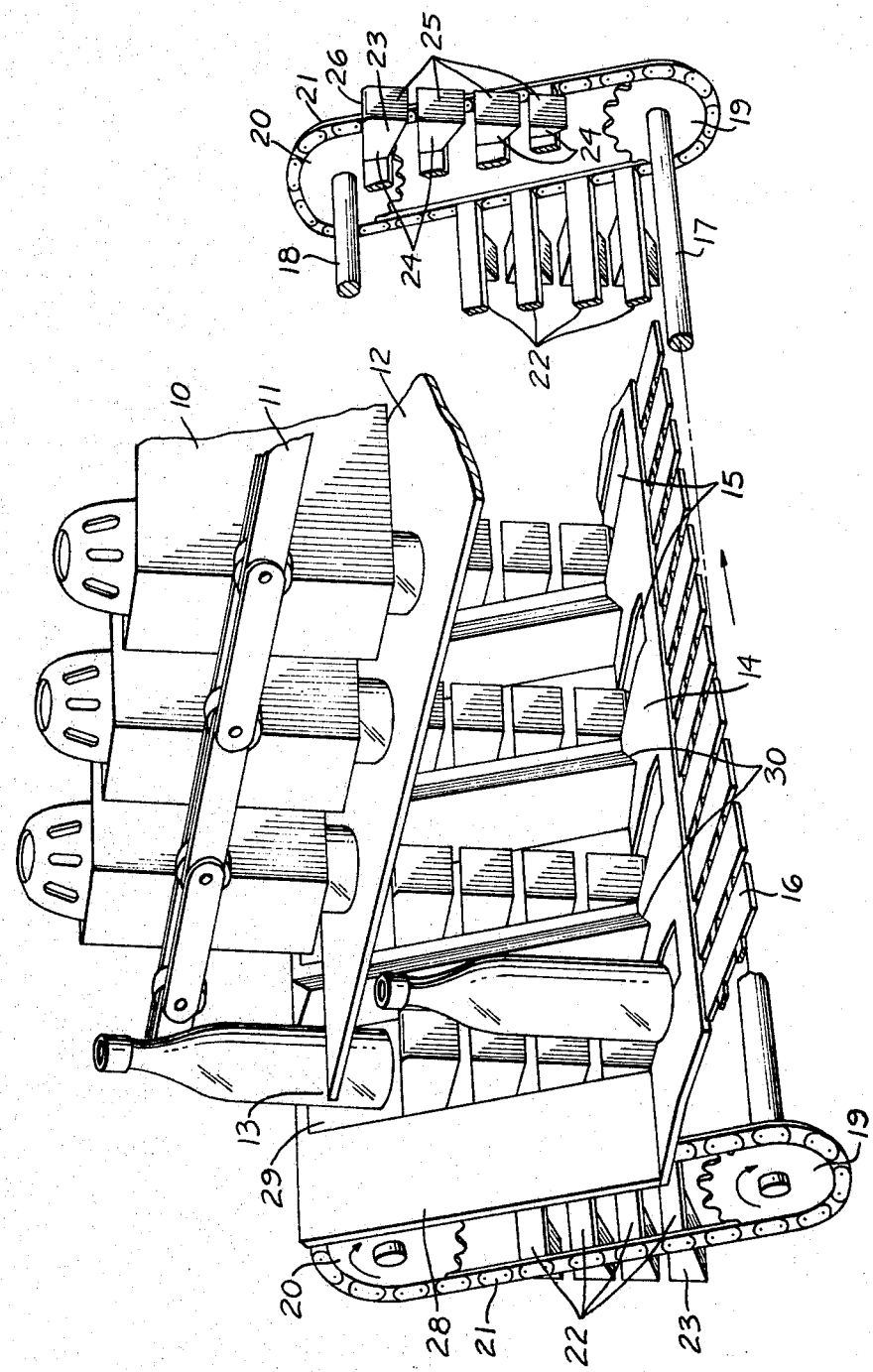
FIG. 1 is an isometric view of a discharging device according to the present invention as seen from the front.

Referring now to the drawings in detail, FIG. 1 shows the discharging side of a bottle cleaning machine (not further shown). The discharging side of the machine is provided with the bottle exit in the range of which the cleaned bottles are withdrawn from the machine and are conveyed to an additional processing machine, for instance, a filling machine. The bottle baskets associated with the cleaning machine are designated with the reference numeral 10. These bottle baskets comprise in a manner known per se a plurality of serially arranged compartments into which the bottles are introduced and are conveyed to the processing station of the machine. As transporting means for the bottle baskets serve endless parallel chains 11 which pass through the machine. It is to be assumed that the chains 11 which are firmly connected to the bottle baskets 10 are driven continually.

In the interior of the machine below the transporting path of the bottle baskets 10 there is provided a slide deck 12. It is on this slide deck that the bottles inserted into the basket compartments rest with their bottoms and are secured against falling down. The slide deck 12 extends to the bottle exit 13 of the machine in the range of which the discharge of the cleaned bottles is effected from the basket compartments through a corresponding opening. Below the bottle exit 13, the machine has a horizontal depositing plate 14 which is provided with passage slots 15. Associated with this depositing plate 14 is a conveyor belt 16 which extends in the plane of the plate 14 over the entire width of the machine.

The difference in height between the bottle exit 13 and the depositing plate 14 is bridged by a device which moves the bottles downwardly. This device primarily comprises an endless circulating means with wedge-shaped lowering and transferring members connected to said supporting means. The said supporting means is formed by two shafts 17 and 18 respectively extending within the range of the depositing plate 14 and the exit opening 13. The said shafts 17 and 18 have keyed thereto sprocket wheels 19 and 20 at their respective ends, said sprocket wheels being engaged by corresponding endless chains 21. In addition thereto, the said supporting means have a number of bars or rails 22 which combined in groups extend parallel to the shafts 17 and 18 and are connected to the chains 21. The arrangement and the journalling of the shafts 17 and 18 is so effected that the lower shaft 17 extends below the depositing plate 14 while the upper shaft 18 set back with regard to the vertical plane of shaft 17 extends in spaced relationship to the bottle exit 13. On the thus inclined chain drives 19, 20, 21 there are combined the bars 22 to groups, and each group is connected to a section of the inclined circulating chains 21 in such a way that the groups face each other from opposite sides.

The lowering and transferring members of the supporting means are in the form of wedge-shaped followers 23 and are composed of a plurality of individual elements which are movable relative to each other. Always two of the followers 23 required for a compartment row in the direction of the bottle bodies 10 arranged behind each other are connected to the bars 22 with the wedge surface 24 serving as engaging surface. Each group of bars has associated therewith a follower 23 while each individual member is mounted on a bar 22. The inclination of the wedge surface 24 of the follower 23 is in conformity with the lateral offset of the upper shaft 18 with regard to the lower shaft 17. For this reason one surface 25 of each follower 23 is substantially perpendicular to the depositing plate 14, whereas a surface 26 is arranged horizontally or parallel to the depositing surface 24. The surfaces 26 support the bottles during their lowering operation from the slide deck 12 to the depositing plate 14, whereas the surfaces 25 move the bottles deposited on plate 14 in the direction toward and eventually onto the conveyor 16.

The device furthermore comprises a plate 28 having a plurality of cutouts 29 through which the followers 23 may pass which are respectively arranged in rows adjacent to each other and in alignment with the respective bottle compartments. Said plate 28 rests on the plate 14 and covers the sprocket chain systems 21 and bars 22 toward the front.

Mounted on the cover plate 28 and connected to plate 14 are bars 30 which are located laterally of the cutouts 29 and separate the space between the individual followers 23. These bars 30 serve for guiding the bottles laterally during their downward movement from the deck 12 to the depositing plate 14.

The unloading device which is driven by a motor moving synchronously with the machine drive or which is in direct driving connection with the machine drive will at the bottle exit 13 by means of the followers 23 extending through the cutouts 29 of the cover plate 28 take over the bottles moved thereto in the bottle compartments 10. From the respective compartment 10 over the bottle exit 13, the bottles are received by the followers 23 the circulation of which is tuned in conformity with the transporting movement of the bottle compartments in such a way that the horizontal surfaces 26 of all followers 23 will at a slight distance be located below the exit opening 13 as soon as a bottle compartment 10 has moved over the said opening 13. It will be appreciated that during the movement of each bottle from the deck 12 to the surface 26 of the respective follower, the bottle drops only slightly. The bottles are then moved downwardly in a direction perpendicular to the surface 26 and are deposited on the plate 14. In the course of this lowering movement, the followers 23 located on the opposite strand of the sprocket chain move upwardly into the range of the bottle exit 13 and after having been reversed in direction by the sprocket wheels 20 will with the downwardly directed tip of the smallest individual follower member carry out a lowering movement as just described. In view of the fact that during this downward movement of the last mentioned followers the surface 25 thereof engages the cylindrical portion of the bottles deposited on plate 14, these bottles are moved over the plate onto the conveyor 16 which latter transports the bottles in the direction of the arrow to the next processing station or to any other desired place. During the said upward movement, the followers 23 which carry out the transfer movement will, when their surfaces 26 move into the range of the bottle exit 13, take over a released bottle which is subsequently deposited on plate 14 and during the further rotation of the sprocket chain is by the next following follower which likewise takes over and moves downwardly a bottle, moved in the described manner over plate 14 onto the belt 16.

Figure 2:
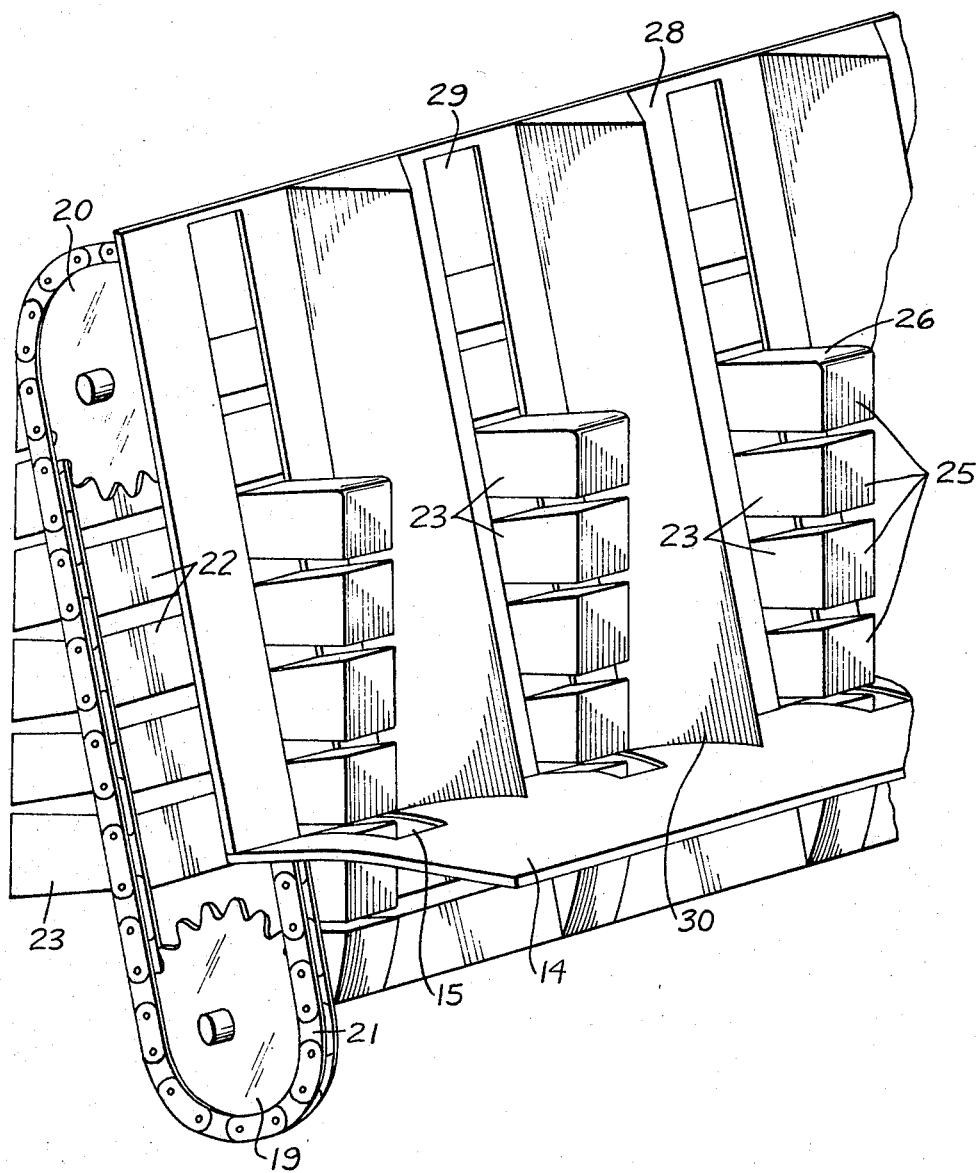
FIG. 2 illustrates on a larger scale than FIG. 1 a detail of the latter.

By increasing the number of the individual elements, as will be clear from FIG. 2, the shape of the followers 23, especially the wedge angle, may be changed. In this way the speed of the transfer movement can be controlled. On the other hand, it is also possible in this way to adapt the discharging device to the height of the bottle exit and the offset mounting of the shafts of the sprocket transmission.

It is, of course, to be understood that the present invention is, by no means, limited to the particular construction shown in the drawings but also comprises any modifications within the scope of the appended claims.

What I claim is:

1. A discharging device for bottle cleaning machines, which comprises: first bottle conveying means including bottle compartments for conveying bottles in said compartments to a bottle release station, deck means arranged below said compartments for slidingly supporting the bottoms of bottles in said compartments, deposit plate means arranged at a lower level than and in vertically spaced relationship to said deck means for receiving bottles released from said compartments at said bottle release station, transloading means arranged at said bottle release station and operable to successively receive bottles from said first bottle conveying means and to transload said bottles onto said deposit plate means and subsequently to transfer the bottles transloaded onto said deposit plate means from the latter to a second conveying means, said transloading means including endless circulating means and at least two wedge-shaped follower means supported directly laterally on and movable exclusively by said endless circulating means from an ineffective position to an effective position and from an effective position to an ineffective position, each one of at least said two wedge-shaped follower means when in effective position having an at least approximately horizontal top surface with the uppermost one of said top surfaces adapted to support a bottle and to transfer said bottle onto said deposit plate means, each one of at least said two wedge-shaped follower means when in effective position also having a front surface arranged at an angle to said top surface for direct engagement with a bottle on said deposit plate means while said transloading means is moving to transfer said last mentioned bottle to a second conveying means.

2. A device according to claim 1, in which said front surfaces of said wedge-shape follower means in effective position thereof are at least approximately perpendicular simultaneously also to the respective top surface of said deposit plate means.

3. A device according to claim 1, in which said transloading means include sprocket wheel drives with a pair of upper and lower sprocket wheel means respectively adjacent said transloading station and said deposit plate means, and in which the vertical plane through the lower sprocket wheel means is closer to said deposit plate means than that through the upper sprocket wheel means.

4. A device according to claim 1, in which said transloading means includes endless conveying means and wheel means near said transloading station and said deposit plate means respectively and also includes a plurality of substantially horizontal bars composed collectively to a plurality of groups directly connected to coplanar within said endless conveying means.

5. A device according to claim 1, which includes cover plate means covering a portion of said transloading means toward the front of the device and provided with adjacent cutouts for the passage of said wedge-shaped follower means in alignment directly therethrough, and guiding means arranged laterally of said cutouts and said follower means for laterally guiding bottles on said follower means.

References Cited
UNITED STATES PATENTS 1,461,638  7/1923  Wells _____ 198—157

RICHARD E. AEGERTER, Primary Examiner